US012769417B2

(12) United States Patent
Kremin et al.

(10) Patent No.: US 12,769,417 B2
(45) Date of Patent: Oct. 20, 2026

(54) TOUCH SENSING

(71) Applicant: Cypress Semiconductor Corporation, San Jose, CA (US)

(72) Inventors: Viktor Kremin, Lviv (UA); Roman Ogirko, Lviv (UA); Pavlo Saldak, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 79 days.

(21) Appl. No.: 19/022,822

(22) Filed: Jan. 15, 2025

(65) Prior Publication Data

US 2026/0202928 A1 Jul. 16, 2026

(51) Int. Cl.

*G06F 3/041* (2006.01)
*B60K 35/10* (2024.01)
*G06F 3/044* (2006.01)

(52) U.S. Cl.

CPC .......... *G06F 3/04164* (2019.05); *B60K 35/10* (2024.01); *G06F 3/04166* (2019.05); *B60K 2360/1434* (2024.01); *B60K 2360/197* (2024.01); *G06F 3/0446* (2019.05); *G06F 2203/04104* (2013.01)

(58) Field of Classification Search

None
See application file for complete search history.

(56) References Cited

U.S. PATENT DOCUMENTS

| | | | | |
|---|---|---|---|---|
| 7,239,947 | B2 * | 7/2007 | Suzuki | G01C 21/3664 701/36 |
| 2015/0212584 | A1 * | 7/2015 | Aoyama | G06V 20/59 345/173 |
| 2017/0249718 | A1 * | 8/2017 | Wunderlich | G06F 3/0488 |
| 2025/0370570 | A1 * | 12/2025 | Lin | G06F 3/04186 |

* cited by examiner

*Primary Examiner* — Krishna P Neupane

(57) ABSTRACT

In an embodiment of the techniques presented herein, a method for touch detection includes detecting a touch event on a touch panel, sending an excitation signal to the touch panel, sensing a first response to the excitation signal in a first conductive element at a first position relative to the touch panel, sensing a second response to the excitation signal in a second conductive element at a second position relative to the touch panel, identifying one of the first position or the second position as an initiating position for the touch event based on the first response and the second response, and controlling the touch panel based on the initiating position.

20 Claims, 11 Drawing Sheets

TOUCH SENSING

BACKGROUND

Computing devices in vehicles have user interface devices, such as touch-sensor pads (also commonly referred to as touchpads), touch-sensor sliders, touch-sensor buttons, touch-sensor keyboards, touch screens, touch panels, etc. Capacitance-sensing devices are, at times, used to replace mechanical buttons, knobs, and other similar mechanical user interface controls in user interface devices. Capacitance-sensing devices have relatively few complicated mechanical switches, buttons, etc., and can generally provide reliable operation under harsh conditions. In addition, capacitance-sensing devices are widely used in modern customer applications, allowing new user interface options to be developed relatively easily in existing products.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

In an embodiment of the techniques presented herein, a method for touch detection comprises detecting a touch event on a touch panel, sending an excitation signal to the touch panel, sensing a first response to the excitation signal in a first conductive element at a first position relative to the touch panel, sensing a second response to the excitation signal in a second conductive element at a second position relative to the touch panel, identifying one of the first position or the second position as an initiating position for the touch event based on the first response and the second response, and controlling the touch panel based on the initiating position.

In an embodiment of the techniques presented herein, a touch sensing system comprises a touch panel, a first distributed controller at a first position relative to the touch panel, a second distributed controller at a second position relative to the touch panel, and a touch controller configured to detect a touch event on the touch panel, establish a first communication channel with the first distributed controller, establish a second communication channel with the second distributed controller, evaluate the first communication channel and the second communication channel to identify one of the first position or the second position as an initiating position for the touch event, and control the touch panel based on the initiating position.

In an embodiment of the techniques presented herein, a touch controller comprises touch sensor array terminals, a transmit sequencer configured to generate a transmit signal selectively connectable to the touch sensor array terminals and generate an excitation signal on the touch sensor array terminals, an analog-to-digital-converter module selectively connectable to the touch sensor array terminals to measure responses to the transmit signal, and a processor configured to detect a touch event based on the responses to the transmit signal, receive a first signal responsive to the excitation signal and associated with a first position relative to the touch sensor array terminals, receive a second signal responsive to the excitation signal and associated with a second position relative to the touch sensor array terminals, identify one of the first position or the second position as an initiating position for the touch event based on the first signal and the second signal, and generate a control signal based on the initiating position.

In an embodiment of the techniques presented herein, a system for touch detection comprises means for detecting a touch event on a touch panel, means for sending an excitation signal to the touch panel, means for sensing a first response to the excitation signal in a first conductive element at a first position relative to the touch panel, means for sensing a second response to the excitation signal in a second conductive element at a second position relative to the touch panel, means for identifying one of the first position or the second position as an initiating position for the touch event based on the first response and the second response, and means for controlling the touch panel based on the initiating position.

DETAILED DESCRIPTION

Figure 1:
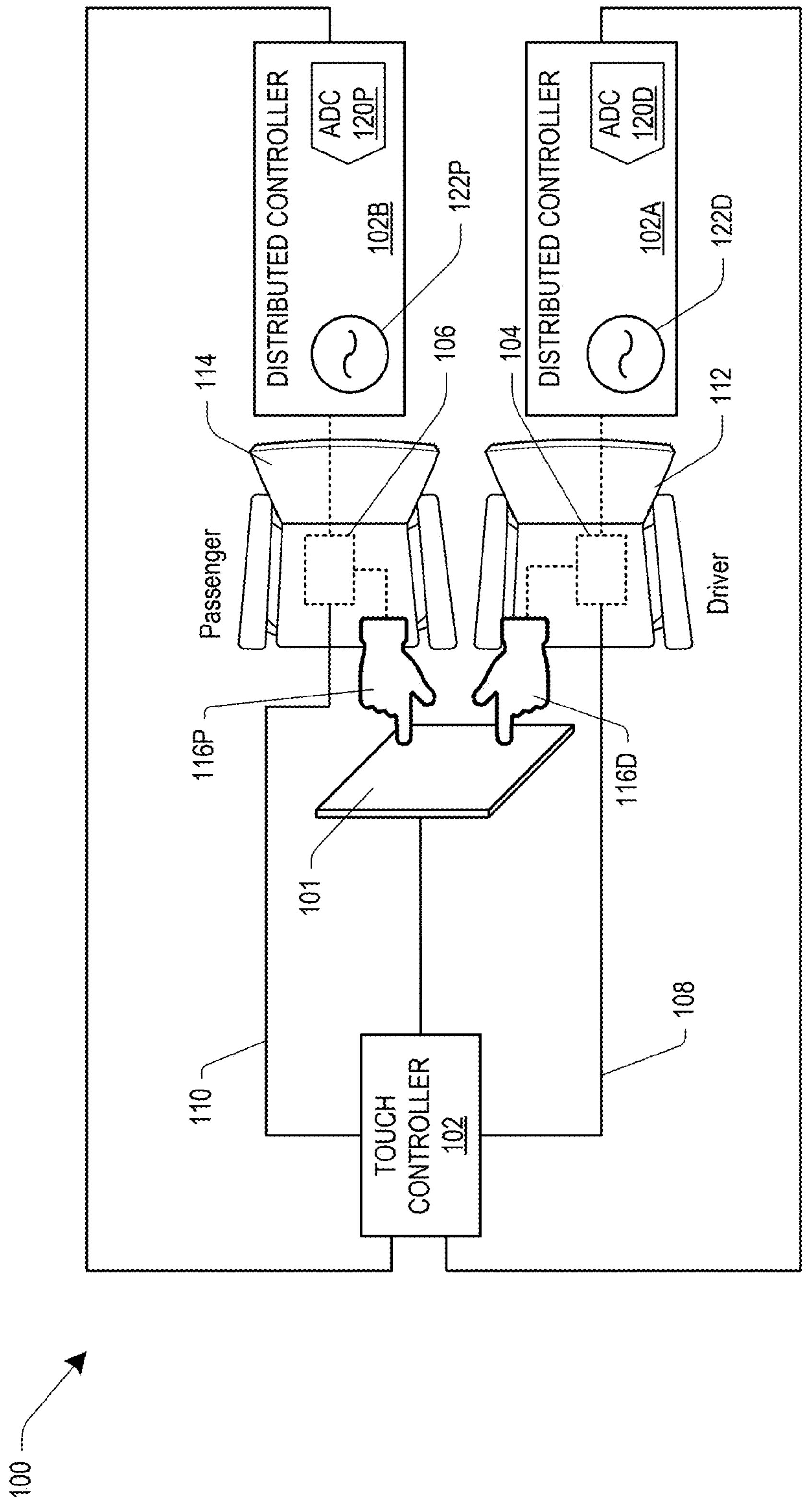
FIG. 1 is a diagram illustrating user identification in a touch sensing system, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

FIG. 1 is a diagram illustrating user identification in a touch sensing system 100, in accordance with some embodiments. In some embodiments, the touch sensing system 100 comprises a touch panel 101, a touch controller 102, and conductive elements 104, 106 that establish a communication channel 108 associated with a first position and a communication channel 110 associated with a second position. The touch sensing system 100 may perform user identification by determining one of the first position or the second position as an initiating position for a touch event detected on the touch panel 101 and control the touch panel 101 based on the initiating position. In some embodiments, one or more functions of the touch controller 102 are performed by distributed controllers 102A, 102B in communication with the touch controller 102. In some embodiments, the distributed controllers 102A, 102B generate excitation signals or receive response signals for user identification, thereby avoiding long signal paths that could give rise to electromagnetic interference (EMI). The distributed controllers 102A, 102B may, in some embodiments, be considered elements of the communication channels 108, 110, respectively. References made below to functions performed by the touch controller 102 may include functions performed by the distributed controllers 102A and/or 102B.

In some embodiments, the touch sensing system 100 is installed in a vehicle, where the first position is associated with a driver of the vehicle and the second position is associated with a passenger in the vehicle. The conductive element 104 may be positioned in a driver seat 112, and the conductive element 106 may be positioned in a passenger seat 114. In some embodiments, the conductive elements 104, 106 are part of circuitry in the seats 112, 114 that have other purposes, such as seat occupancy sensors (capacitive) or seat heating elements (resistive).

In some embodiments, the touch controller 102 injects an excitation signal on the communication channel 108 and detects a response to the excitation signal on the communication channel 108 to determine that the touch event is associated with the driver. Similarly, in some embodiments, the touch controller 102 injects an excitation signal on the communication channel 110 and detects a response to the excitation signal on the communication channel 110 to determine that the touch event is associated with the passenger. The touch controller 102 controls the touch panel 101 based on the initiating position of the touch event. Controlling the touch panel 101 may include sending an indicator of the initiating position (i.e., user identification data) to specify a profile for the touch panel 101, where the profile may indicate what user interface controls or information are displayed on the touch panel 101. For example, some controls may be displayed as being locked responsive to a driver touch event but allowed responsive to a passenger touch event. In some embodiments, a different set of controls may be displayed for the passenger versus the driver. In some embodiments, the touch controller 102 sends touch data and user identification data to an external processor that generates the controls or information on the touch panel 101. In some embodiments, controlling the touch panel 101 comprises suppressing the touch event.

The communication channels 108, 110 and conductive elements 104, 106 may be configured in various methods of operation. For example, the touch controller 102 or the distributed controllers 102A, 102B may transmit excitation signals to the conductive elements 104, 106 and the response may be measured on the touch panel 101 through the driver 116D or the passenger 116P. Alternatively, the touch controller 102 may transmit an excitation signal to the touch panel 101 that is detected by the touch controller 102 or the distributed controllers 102A, 102B based on a response at the conductive elements 104, 106.

Figure 2:
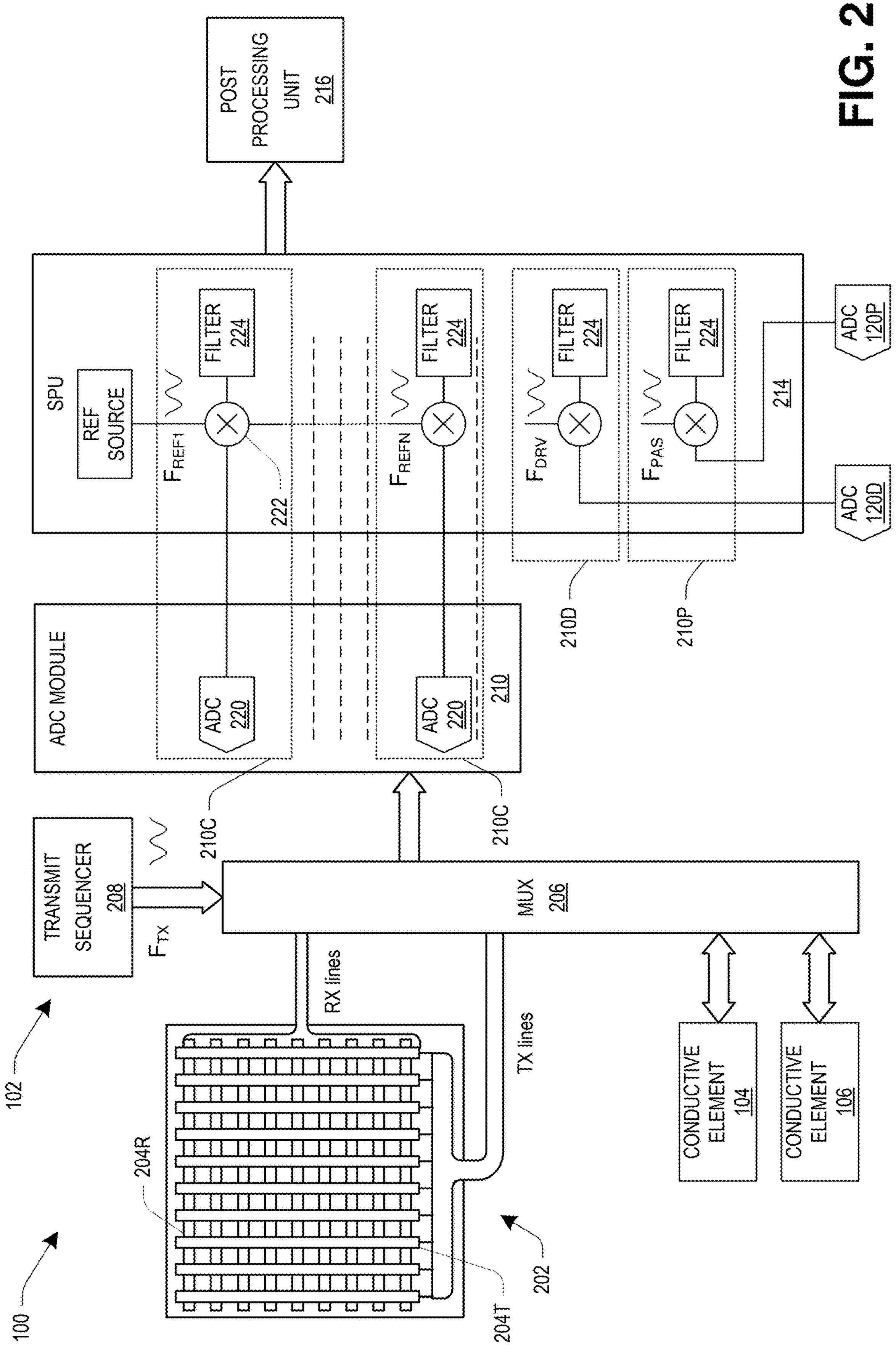
FIG. 2 is a block diagram of a touch sensing system, in accordance with some embodiments.

FIG. 2 is a block diagram of the touch sensing system 100, in accordance with some embodiments. In some embodiments, the touch sensing system 100 comprises the touch panel 101 (typically optically bounded to a display) and the touch controller 102. In some embodiments, the touch panel 101 comprises a touch sensor array 202 comprising transmission (TX) lines 204T and receive (RX) lines 204R, a multiplexer 206 having touch sensor array terminals connected to the touch sensor array 202 and optionally to the conductive elements 104, 106, a transmit sequencer 208, an analog-to-digital converter (ADC) module 210, a signal processing unit (SPU) 214, and a post processing unit 216. In some embodiments, the SPU 214 and the post processing unit 216 may be implemented by a shared processing resource.

In some embodiments, the touch sensing system 100 employs capacitive sensing to determine a touch position on a human machine interface (HMI) that provides user input to a device, such as a display in a vehicle or some other user interface. The HMI may employ a touch sensitive display that acts as an output device and an input device. The TX lines 204T and the RX lines 204R define a grid of orthogonal electrodes. The crossing points of the TX lines 204T and the RX lines 204R define unit cells of the touch sensor array 202. In some embodiments, the TX lines 204T are vertical and the RX lines 204R are horizontal. Alternatively, TX lines 204T can be horizontal and RX lines 204R can be vertical in some embodiments.

A basic operational description of the touch sensing system 100 is provided for touch detection mode. User identification can be time-interleaved with the touch detection or performed concurrently with touch detection, depending on the embodiment.

In touch detection mode a transmit signal ($F_{TX}$) (e.g., an excitation signal) is injected on one or more selected TX lines 204T and the responses to the transmit signal are measured on the RX lines 204R. For example, the responses of the RX lines 204R may be measured in parallel responsive to the excitation of a single TX line 204T using multiple sensing channels 210C in the ADC module 210. In some embodiments, the transmit signal ($F_{TX}$) is a slew rate limited signal, such as a sinusoidal signal, a trapezoidal signal, a square wave signal, or some other type of signal. The TX injection and RX measurement is repeated for each of the TX lines 204T until a scan cycle is completed. In some embodiments, multiple TX lines 204T may be excited and responses may be measured on multiple RX lines 104R concurrently. The transmit sequencer 208 controls the transmit signal on a TX line 204T selected by the multiplexer 206. In some embodiments, the multiplexer 206 routes each of the RX lines 204R to an individual sensing channel 210C so that the responses from the multiple RX lines 204R can be measured in parallel.

In some embodiments, each sensing channel 204C comprises an ADC 220 in the ADC module 210 and a demodulator 222 and a filter 224 in the SPU 214. In some embodiments, where signals are sensed at the conductive elements 104, 106, remote ADCs 120D, 120P may be present in the distributed controllers 102A, 102B and digital response signals generated by the remote ADCs 120D, 120P may be communicated to the SPU 214 and processed in channels 210D, 210P, respectively (e.g., first digital response signal by first distributed controller, second digital response signal by second by second distributed controller, etc.).

The demodulator 222 multiplies the output of the ADC 220 by a demodulator reference signal ($V_{REF1}$-$V_{REFN}$) to demodulate the RX response, and the filter 224 filters the demodulated output, for example, noise filtering, baseline filtering, hardware debounce filtering, or some other filtering. In some embodiments, the ADC 220 is implemented as a sigma-delta modulator and the filter 124 is a sinc filter or a sinc filter chain with differing decimation ratios for the multiple filters in the chain. In some embodiments, each sensing channel 104C employs a different demodulator reference signal ($F_{REF1 \ldots N}$). For example, different phase delays may be used for the reference signals ($F_{REF1 \ldots N}$) for phase delay tuning as part of the system calibration. In an alternative embodiment, the same demodulator reference signal ($F_{REF}$) is used for each sensing channel 104C ($F_{REF}$=$F_{REF1 \ldots N}$).

The SPU 214 processes data generated by the ADC 220 for each of the RX lines 204R to generate response data for the touch sensor array 202. In some embodiments, the SPU 214 processes the data from the ADCs 220 for noise reduction, gain normalization, etc. The post processing unit 216 processes the response data to recognize touch events, calculate one or more touch positions (e.g., single touch or multi-touch), determine touch properties, such as movement direction, or recognize gestures (e.g., over multiple scan cycles).

The touch event detection operation described herein may be integrated with user identification. In some embodiments, the conductive elements 104, 106 are connected to the multiplexer 206 to allow routing of excitation signals to the conductive elements 104, 106 or to measure response signals at the conductive elements 104, 106. In some embodiments, a connection between the conductive elements 104, 106 and the touch panel 101 is established through the driver 116D or the passenger 116P.

FIGS. 3-7B are diagrams illustrating configurations of the touch controller 102 for employing the communication channels 108, 110 and the conductive elements 104, 106 to perform user identification for touch events, in accordance with some embodiments.

Figure 3:
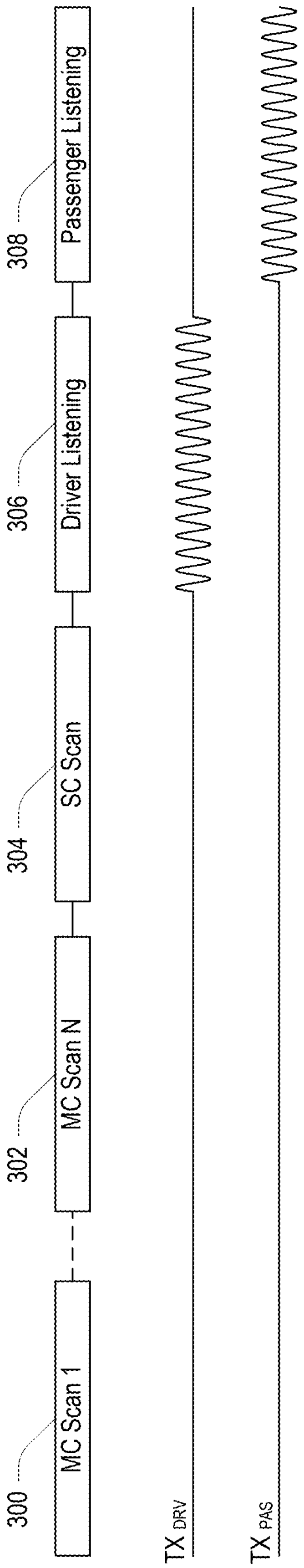
FIG. 3 illustrates an example where a touch controller sends excitation signals to conductive elements, in accordance with some embodiments.

FIG. 3 illustrates an example where the communication channels 108, 110 are configured to send excitation signals from the touch controller 102 to the conductive elements 104, 106. Touch detection is performed during mutual capacitance (MC) scan intervals 300, 302 for each channel 210C and during a self-capacitance (SC) scan interval 304. The touch controller 102 sends a driver excitation signal ($TX_{DRV}$) on the communication channel 108 to the conductive element 104 in the driver seat 112 during a driver listening interval 306, and a response to the driver excitation signal ($TX_{DRV}$) is measured by the RX lines 204R in the touch sensor array 202. Similarly, the touch controller 102 sends a passenger excitation signal ($TX_{PAS}$) on the communication channel 110 to the conductive element 106 in the passenger seat 114 during a passenger listening interval 308, and a response to the passenger excitation signal ($TX_{PAS}$) is measured by the RX lines 204R in the touch sensor array 202.

Depending on the location of the individual initiating the touch event (i.e., driver or passenger) one or both intervals 304, 306 will generate a user identification event, as both the driver and the passenger could be touching the touch panel 101. In the example of FIG. 3, time interleaving is used for detecting touch events and user identification. Due to the time interleaving, the same $F_{TX}$ signal may also be used for the $TX_{DRV}$ and $TX_{PAS}$ signals. The same frequency as the $F_{TX}$ reference signal ($F_{REF}$) may be used for user identification associated with the touch event. The touch event detection and user identifications may be performed using the same sensing channel 210C due to the time interleaving. The touch controller 102 may control the touch panel 101 depending on the user identification by disabling certain controls, displaying different data, etc. If both driver and passenger touches are detected or if an error condition is detected, the touch controller 102 may default to driver restrictions for control of the touch panel 101.

Figure 4:
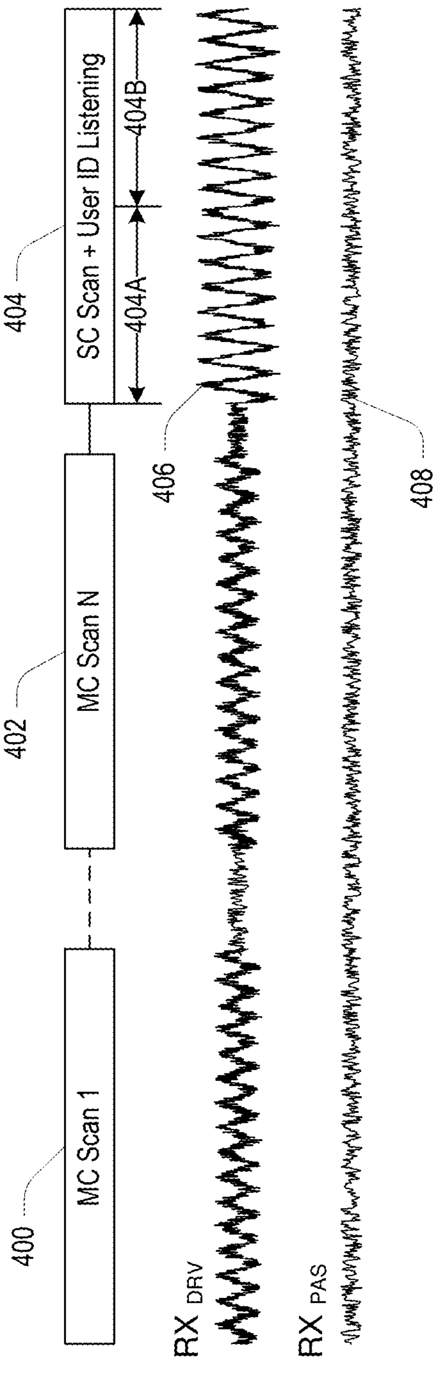
FIG. 4 illustrates an example where a touch controller sends excitation signals through a touch sensor array, in accordance with some embodiments.

FIG. 4 illustrates an example where the touch controller 102 sends excitation signals through the touch sensor array 202 in the touch panel 101 and the response is communicated through a user touching the touch panel 101 and received by the conductive elements 104, 106 that are connected to the touch controller 102. In some embodiments, the distributed controllers 102A, 102B sense the responses on the conductive elements 104, 106 (e.g., using remote ADCs 120P, 120D) and communicate the responses to the touch controller 102 for additional processing in the SPU 214. Touch detection is performed during MC scan intervals 400, 402 for each channel 210C and touch detection and user identification are performed concurrently during an SC scan and user identification interval 404.

The TX signal used by the touch controller 102 to excite the TX lines 204T is detected by the conductive element 104 in the driver seat 112 or by the conductive element 106 in the passenger seat 114 based on which user is touching the touch panel 101. Hence, the conductive elements 104, 106 may act as additional RX inputs with the RX lines 204R or the distributed controllers 102A, 102B may sense the responses on the conductive elements 104, 106. In the example, of FIG. 4, the touch event is initiated by the driver resulting in a response in an $RX_{DRV}$ signal 406 and no response in an $RX_{PAS}$ signal 408. In some embodiments, additional listening intervals are not needed, thereby reducing latency. In some embodiments, the driver and passenger excitation signals may be suppressed during the MC scan intervals 400, 402.

In some embodiments, the SC scan and user identification interval 404 is divided into two subintervals 404A, 404B for time interleaving and the same frequency is used for driver detection and passenger detection ($RX_{DRV}$=$RX_{PAS}$), where driver listening occurs during one of the subintervals 404A, 404B and passenger listening occurs during the other subinterval 404A, 404B.

Performing user identification concurrently with the SC scan during the interval 404 allows detection when entire touch sensor array 202 is driven with the same signal level, thereby providing maximum coupling to hand of the driver 116D or the passenger 116P. The user identification may be performed using one or more spare channels 210C to implement touch sensing and user identification using parallel hardware resources. For example, the multiplexer 206 may be configured to connect the conductive element 104 to a first spare channel 210C and to route the conductive element 106 to a second spare channel 210C in the embodiment where driver listening and passenger listening during the SC scan and user identification interval 404 is performed concurrently. Alternatively, the multiplexer 206 may be configured to connect the conductive element 104 to a first channel 210C during one of the subintervals 404A, 404B of the SC scan and user identification interval 404 and to route the conductive element 106 to the same channel 210C during the other subinterval 404A, 404B where driver and passenger listening are time interleaved.

Figure 5A:
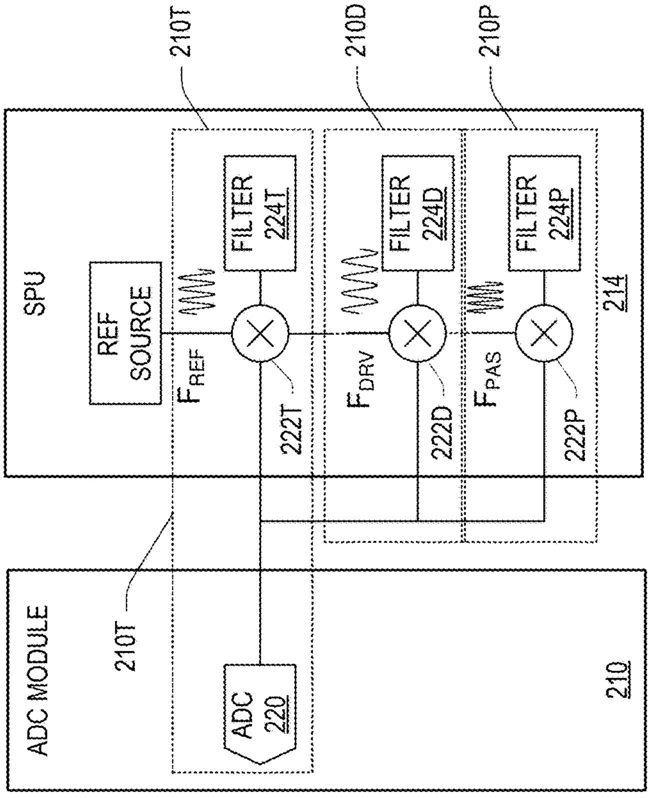
FIGS. 5A and 5B illustrate an example where signal generators generate excitation signals at positions remote from a touch panel and responses are identified using separate demodulation channels, in accordance with some embodiments.
Figure 5B:
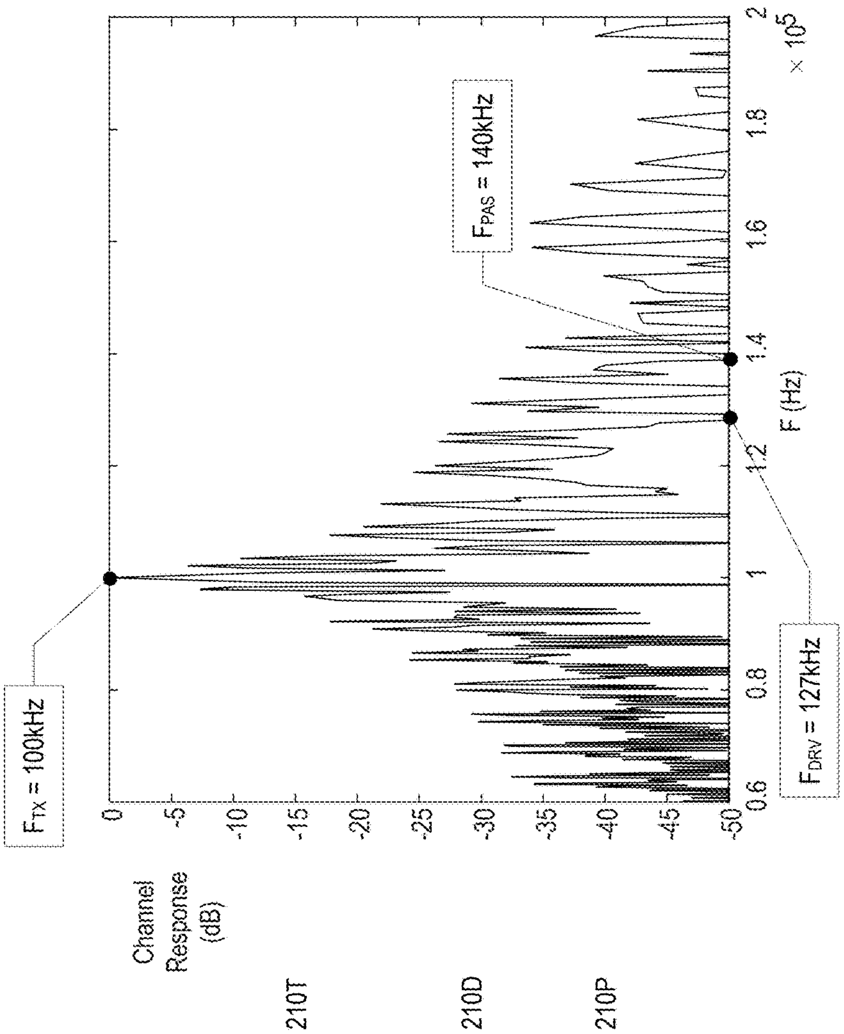

FIGS. 5A and 5B illustrates an example where the distributed controllers 102A, 102B include signal generators 122D, 122P that apply an $F_{DRV}$ signal with a first excitation frequency to the conductive element 104 and apply an $F_{PAS}$ signal with a second excitation frequency to the second conductive element 106, respectively. The responses to the $F_{DRV}$ and $F_{PAS}$ signals are sensed by the touch sensor array 202 in the touch panel 101. FIG. 5A illustrates the configuration of the ADC module 210 and the SPU 214, in accordance with some embodiments. Touch detection and user identification are performed in parallel during the MC interval using parallel demodulation channels 210T, 210D, 210P with the different reference detector frequencies $F_{DRV}$, $F_{PAS}$ for the same data stream from the ADC 220. This embodiment obviates the need for connections between the conductive elements 104, 106 and the touch controller 102, as the responses to the $F_{DRV}$ and $F_{PAS}$ signals are sensed by the touch sensor array 202 using signals communicated through the driver 116D or the passenger 116P. The frequencies of the $F_{DRV}$ and $F_{PAS}$ signals are different than the frequency of the $F_{TX}$ signal used for touch detection to facilitate concurrent touch detection, driver identification, and passenger identification. Compared to the time interleaved detection in the embodiment of FIG. 3, the embodiment of FIGS. 5A and 5B performs scanning and user identification concurrently using multi-frequency techniques.

FIG. 5B illustrates a Noise Transfer Function (NTF) that characterizes the touch detection sensing channel after multiphase deconvolution for touch detection. The peak of the NTF is centered at the touch detection frequency ($F_{TX}$). The frequencies of $F_{DRV}$ and $F_{PAS}$ are selected to correspond to zeros of the channel frequency response to minimize interference on touch detection. As seen in FIG. 5A, a channel 210T is configured for touch detection where a demodulator 222T and a filter 224T are configured to detect the $F_{REF}$ signal. A demodulator channel 210D is configured for driver identification where a demodulator 222D and a filter 224D are configured based on the $F_{DRV}$ signal. A demodulator channel 210P is configured for passenger identification where a demodulator 222P and a filter 224P are configured based on the $F_{PAS}$ signal. In an embodiment, $F_{TX}$ is 100 kHz, $F_{DRV}$ is 127 kHz, and $F_{PAS}$ is 140 kHz. In some embodiments, different integrated circuit chips with appropriate synchronization may be employed for touch processing, driver data processing in the channel 210D, and passenger data processing in the channel 210P.

Figure 6:
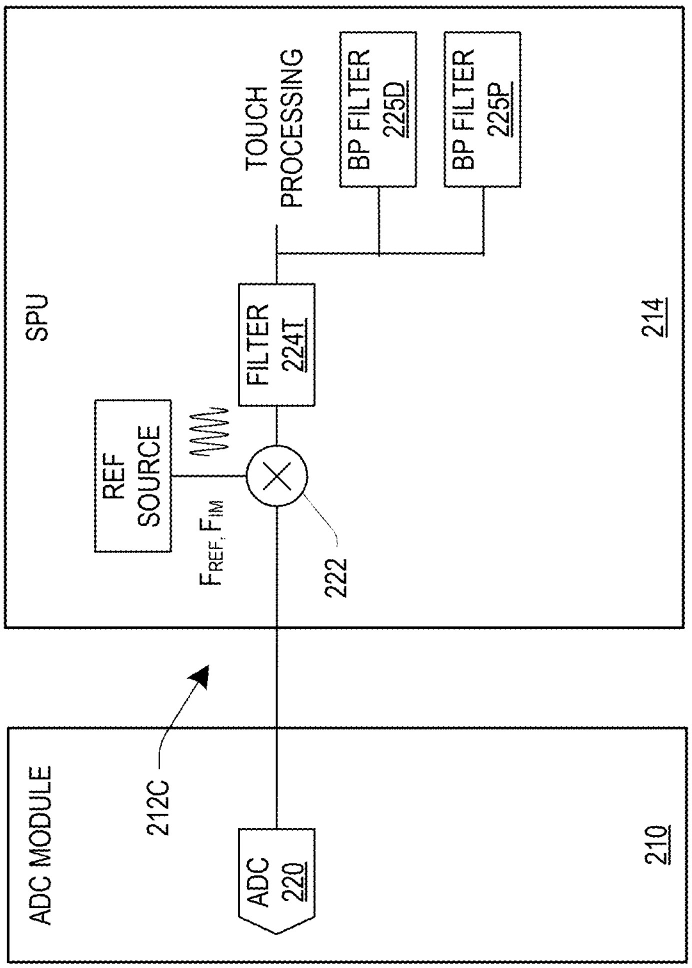
FIG. 6 illustrates an example where signal generators generate excitation signals at positions remote from a touch panel and responses are identified using band pass filtering, in accordance with some embodiments.

FIG. 6 illustrates an example where the distributed controllers 102A, 102B include signal generators 122D, 122P that apply an $F_{DRV}$ signal with a first excitation frequency to the conductive element 104 and apply an $F_{PAS}$ signal with a second excitation frequency to the second conductive element 106, respectively. FIG. 6 illustrates the configuration of the ADC module 210 and the SPU 214, in accordance with some embodiments. In an implementation where different reference signals are not available at the same time, down mixing is performed with an intermediate frequency ($F_{IM}$) in the demodulator 222. A filter 224T generates an output for deconvolution touch processing. The touch processing data stream can be filtered additionally, if required. A band pass filter 225D is configured to select the $F_{DRV}$ signal and a band pass filter 225P is configured to select the $F_{PAS}$ signal from $F_{IF}$. In an embodiment the user listening interval is time interleaved as illustrated in FIG. 3, but the listing for the driver and passenger channels may be conducted in parallel due to the different frequencies. In some embodiments, the filter 224T is a two-stage cascaded integrator-comb filter. A two-stage comb filter enables calculation of the noise metrics from first stage and touch raw data after the second stage. The noise metrics enable high-level post-processing algorithms to inhibit false touches, for example. The first stage integration time is selected to correspond to the duration of the $F_{TX}$ half-period, in some embodiments. In some embodiments, different integrated circuit chips with appropriate synchronization may be employed for touch processing, driver data processing in the BP filter 225D, and passenger data processing in the BP filter 225P.

Figure 7A:
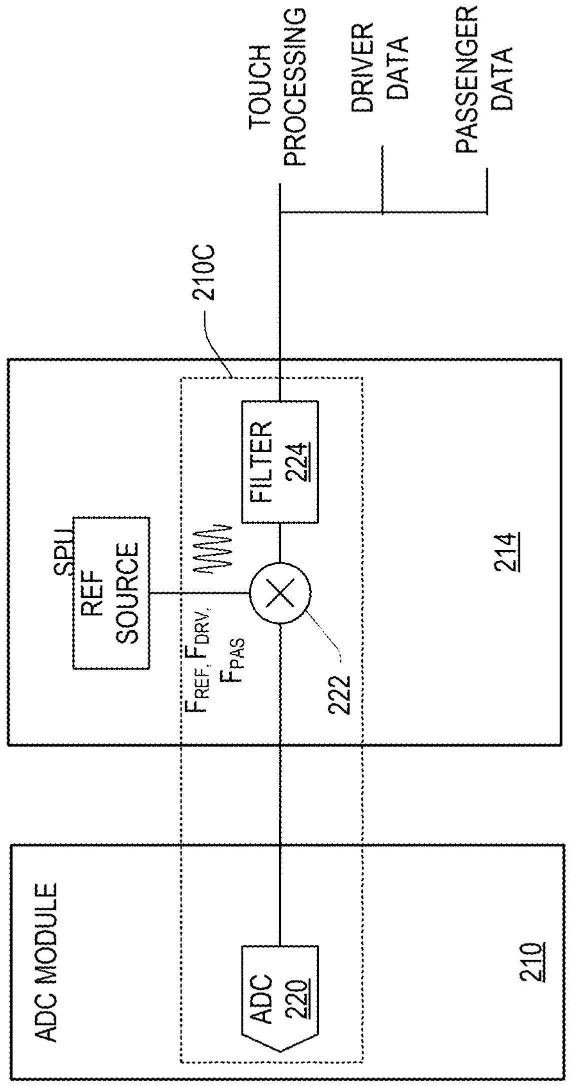
FIGS. 7A and 7B illustrate an example where signal generators generate excitation signals at positions remote from a touch panel and responses are identified using pseudo-quadrature scanning, in accordance with some embodiments.
Figure 7B:
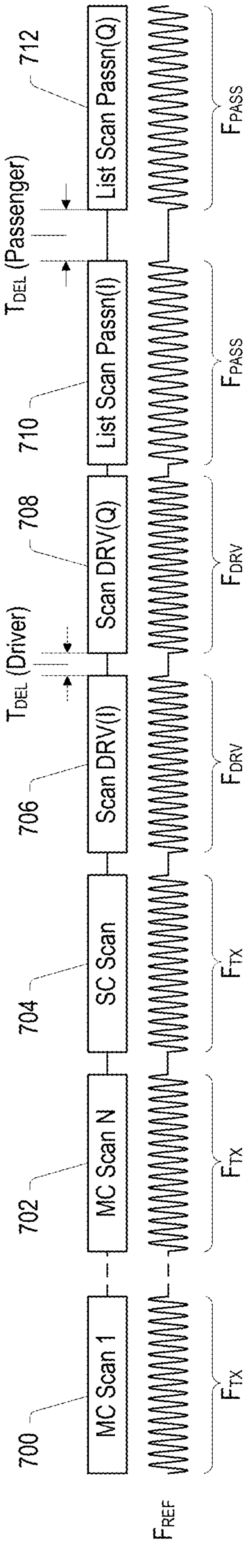

FIGS. 7A and 7B illustrates an example where the distributed controller 102A comprises a signal generator 122D generating a $F_{DRV}$ signal with a first frequency and the distributed controller 102B comprises a signal generator 122P generating a $F_{PAS}$ signal with a second frequency. In this embodiment the SPU 214 performs scanning (detection) for all three frequencies in the ADC 220 stream sequentially, by changing the demodulator reference clock to $F_{REF}$, $F_{DRV}$, and $F_{PAS}$ in sequential intervals. In some embodiments the signals coming from the conductive elements 104 and 106 might have an unknown initial phase. In this configuration, implementing the plain quadrature channel with parallel I/Q channels is desirable to remove the impact of the unknown initial input signal phase.

In an implementation where implementing plain quadrature channel is not possible, pseudo quadrature scanning may be performed to mitigate the impact of the unknown signal phase from the conductive elements 104 or 106. In some embodiments, two scan cycles may be implemented with a delay between the cycles corresponding to a cycle quarter of the period of the excitation signal. FIG. 7A illustrates the configuration of the ADC module 210 and the SPU 214, in accordance with some embodiments. FIG. 7B illustrates the scanning intervals. A channel 210C includes an ADC 220, a demodulator 222, and the filter 224. In some embodiments, the filter 224 generates an output for deconvolution touch processing during MC scan intervals 700, 702 and a SC scan interval 706. The filter 224 generates driver data during an in-phase interval 706 and a quadrature interval 708. The filter 224 generates passenger data during an in-phase interval 710 and a quadrature interval 712. In some embodiments, the filter 224 is a two-stage cascaded integrator-comb filter.

For the touch scan intervals 700, 702, 704 the demodulation sequence starts from zero to avoid increasing channel output noise. In some embodiments, the I and Q scan intervals 708, 708 or 710, 712 are time interleaved based on a precision delay to form the pseudo-quadrature channel to provide a shift for a quarter of a period between scans:

$$T_{DEL}=T_{DEM}(1/4+N),$$

where $T_{DEM}$ is the period of the demodulation frequency (i.e., $T_{DRV}=1/F_{DRV}$ or $T_{DRV}=1/F_{PAS}$) and N is an integer number, including zero. In other words, once the in-phase scan cycle is performed, the a quadrature cycle is started with a precision delay between adjacent scan cycles equal to a quarter of the searching frequency period plus an integer number of the full periods. This pseudo-quadrature scan method provides close to the pure quadrature channel performance in terms of the insensitivity to the input signal phase, however, additional hardware is not required to perform parallel quadrature scanning. In some embodiments, different integrated circuit chips with appropriate synchronization may be employed for touch processing, driver data processing, and passenger data processing. Usage of the pseudo quadrature channel helps to build a system which does not require synchronization between the distributed controllers 102A, 102B and the touch controller 102.

In some embodiments, the time shift may be generated using a timer table or counter to trigger the start of the scan. A reference clock is selected to the $F_{DRV}$ signal for the scan intervals 706, 708 and to the $F_{PAS}$ signal for the scan intervals 710, 712. Note that the delay between pseudo I/Q scans for the driver ($T_{DEL}$) and passenger identification is not the same, as the reference clocks are different in the both cases.

After the touch scan intervals 700, 702, 704 are performed, the TX signal ($F_{TX}$) source is turned off and the four listening scan intervals 706, 807, 710, 712 are executed for searching the specific frequencies of the driver signal ($F_{DRV}$) and the passenger signal ($F_{PAS}$). The results of the pseudo-quadrature scan intervals 706, 708, 710, 712 are processed to determine squares of the amplitudes ($A_{DRV}$, $A_{PAS}$) which are compared with predefined threshold values. There are four possible cases:

- Both $A_{DRV}$, $A_{PASS}$ are high—meaning external environment might be noisy or both driver and passenger are touching the touch panel 101 at the same time, so user identification is not possible;
- Both $A_{DRV}$, $A_{PASS}$ are low—meaning no distributed controller signal is detected (e.g. due to the hardware failure or user not sitting in the seat), so no user identification is possible;
- $A_{DRV}$ is high—touch event initiated by is driver; or
- $A_{PASS}$ is high—touch event initiate by passenger.

As described above, if user identification is not possible, the touch controller 102 may default to driver restrictions for control of the touch panel 101.

Figure 8A:
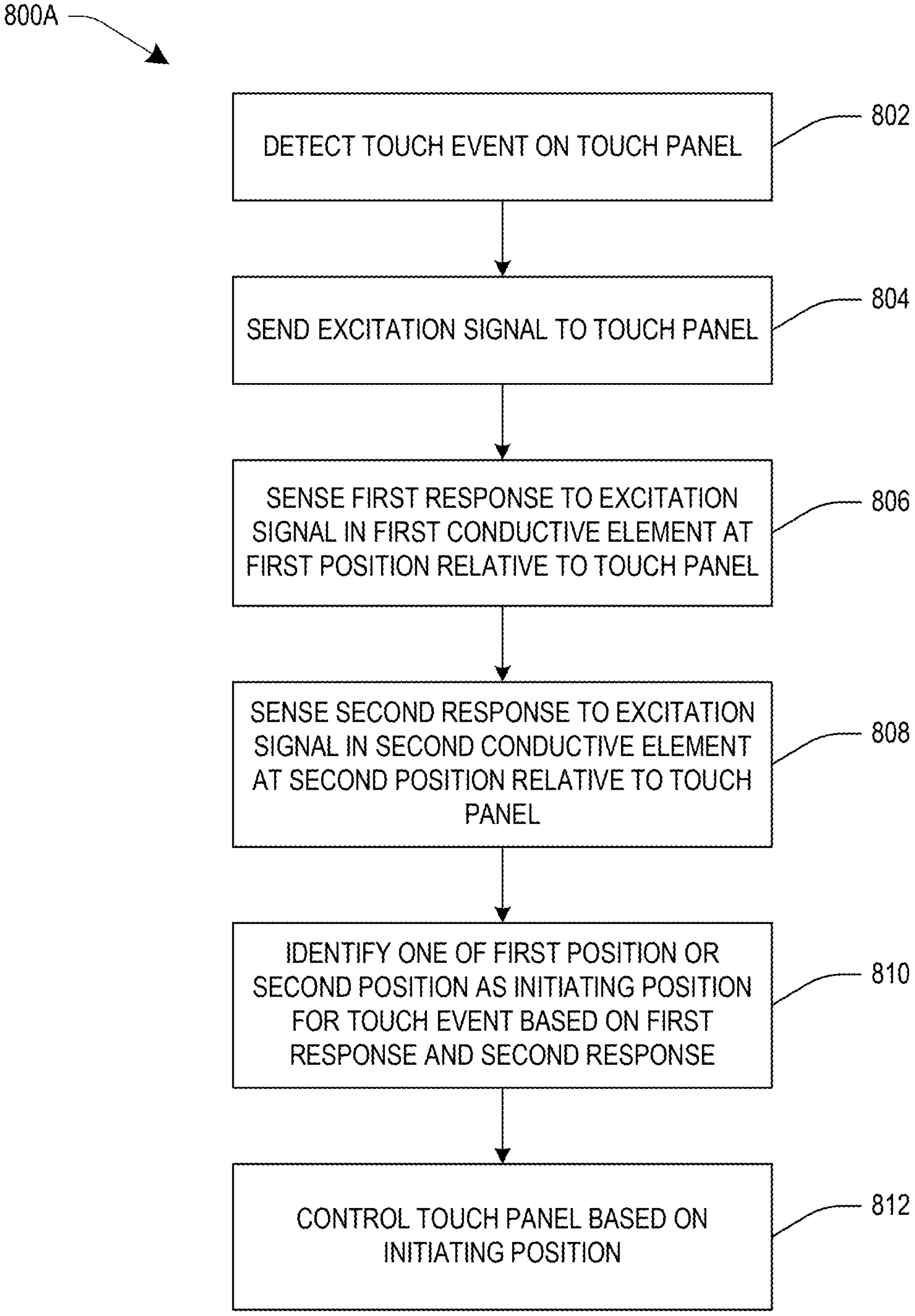
FIGS. 8A-8C are flow diagrams illustrating methods for user identification in a touch sensing system, in accordance with some embodiments.
Figure 8B:
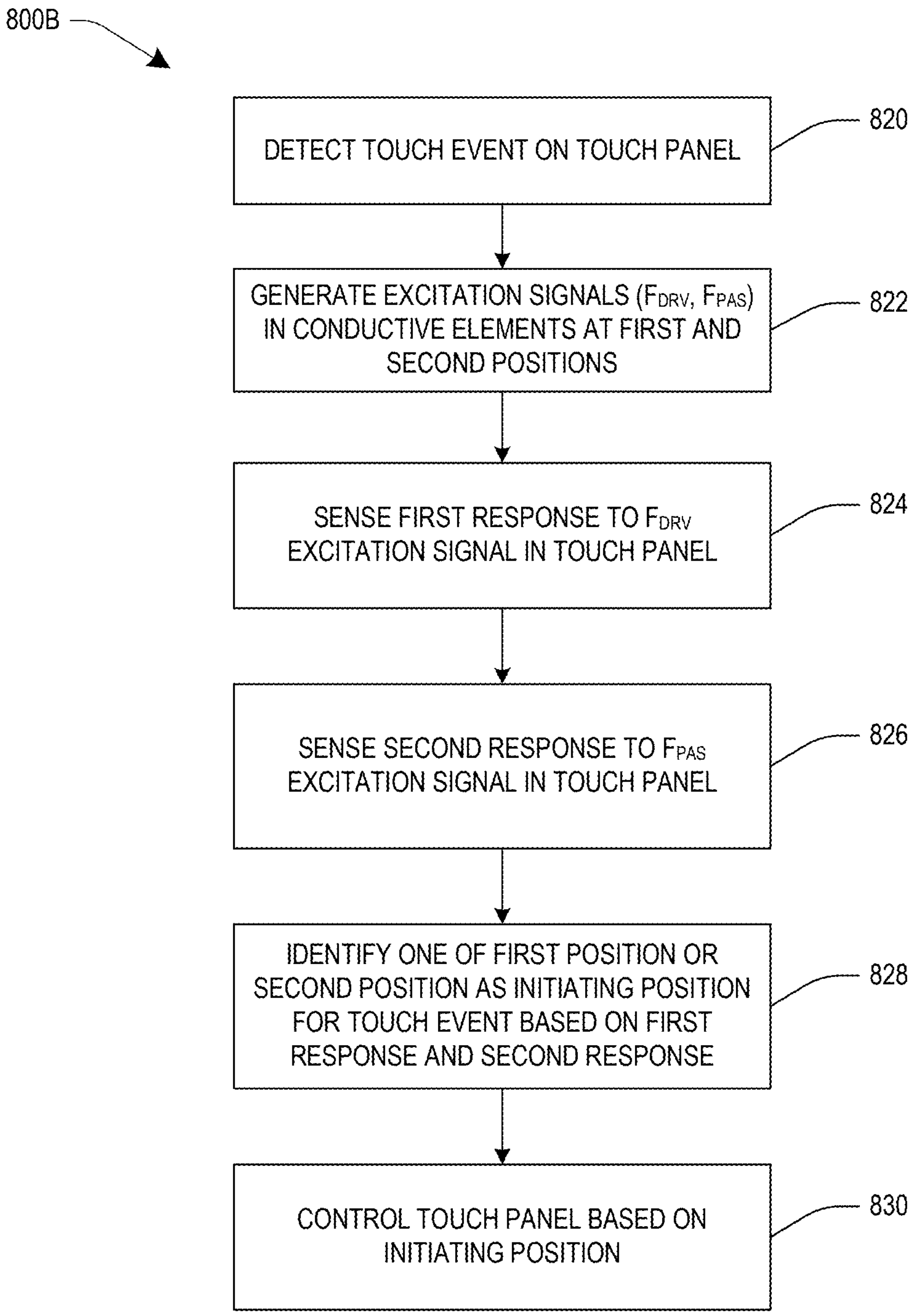
Figure 8C:
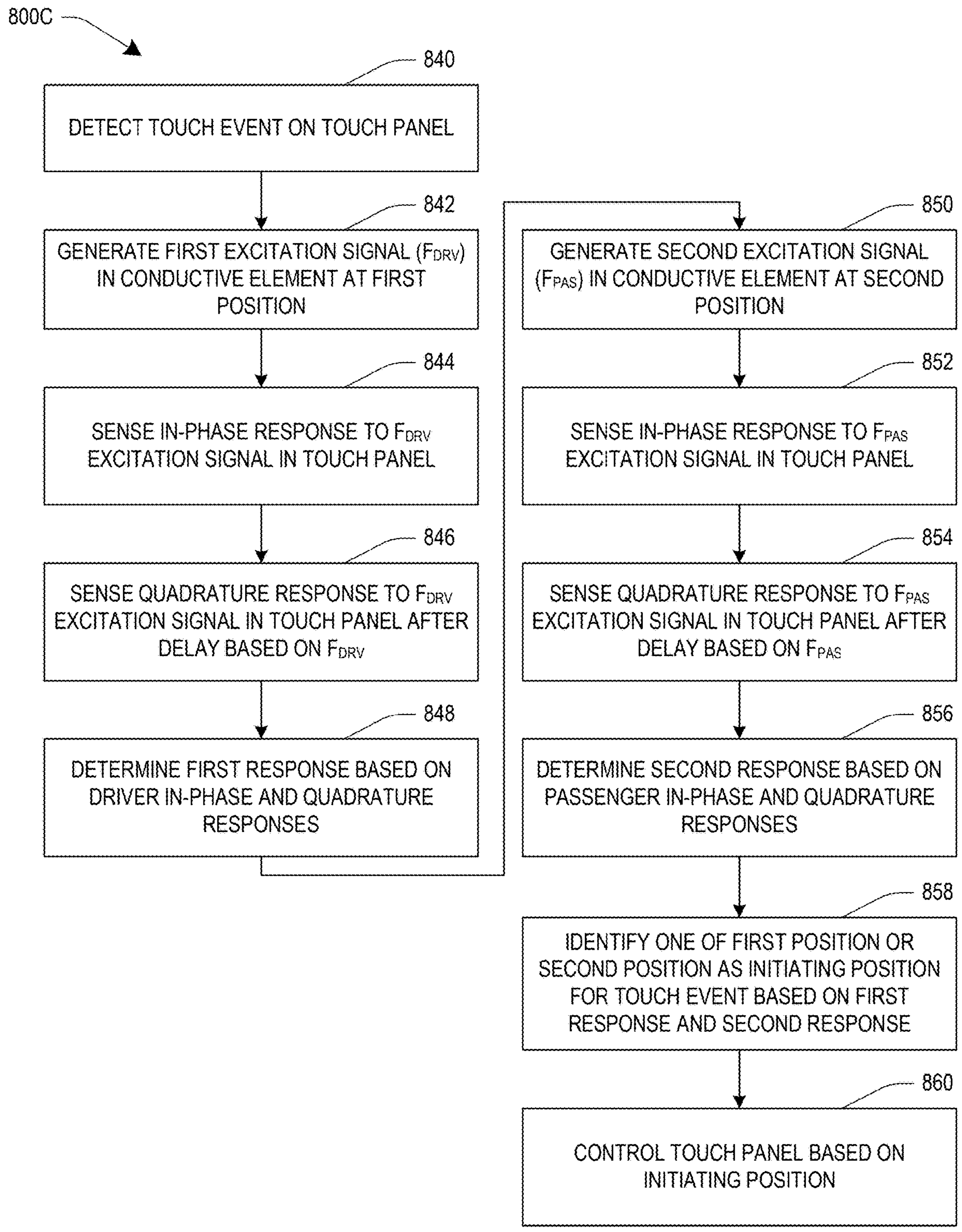

FIGS. 8A-8C are flow diagrams illustrating methods 800A, 800B, 800C for user identification in a touch sensing system, in accordance with some embodiments. The method 800A may be associated with the embodiment illustrated in FIGS. 3 and 4. At 802, a touch event is detected on a touch panel 101 according to the particular touch detection technique implemented. At 804, an excitation signal is sent to the touch panel 101. At 806, a first response to the excitation signal is sensed in a first conductive element 104 at a first position (e.g., driver seat) relative to the touch panel 101. At 808, a second response to the excitation signal is sensed in a second conductive element 106 at a second position (e.g., passenger seat) relative to the touch panel 101. At 810, one of the first position or the second position is identified as an initiating position for the touch event based on the first response and the second response. At 812, the touch panel 101 is controlled based on the initiating position.

The method 800B may be associated with the embodiment illustrated in FIGS. 5A, 5B, and 6. At 820, a touch event is detected on the touch panel 101. At 822, excitation signals ($F_{DRV}$, $F_{PAS}$) are generated in the conducive elements 104, 106 at the first and second positions. The distributed controllers 102A, 102B may generate the excitation signals ($F_{DRV}$, $F_{PAS}$). At 824, a first response to the $F_{DRV}$ excitation signal is sensed in the touch panel 101. At 826, a second response to the $F_{PAS}$ excitation signal is sensed in the touch panel 101. At 828, one of the first position or the second position is identified as an initiating position for the touch event based on the first response and the second response. At 830, the touch panel 101 is controlled based on the initiating position.

The method 800C may be associated with the embodiment illustrated in FIGS. 7A and 7B. At 840, a touch event is detected on the touch panel 101. The touch event may be detected by exciting the touch sensor array 202 using the $F_{TX}$ signal and performing mutual capacitance and self-capacitance scans (intervals 700, 702, 704, and 706 in FIG. 7B). At 842, a first excitation signal ($F_{DRV}$) is generated in the conducive element 104 at a first position. The distributed controller 102A may generate the excitation signal ($F_{DRV}$). At 844, an in-phase response to the $F_{DRV}$ excitation signal is sensed in the touch panel 101. At 846, a quadrature response to the $F_{DRV}$ excitation signal is sensed in the touch panel 101 after a delay based on $F_{DRV}$. At 848, a first response is determined based on the driver in-phase and quadrature responses ($A_{DRV}^2=I_{DRV}^2+Q_{DRV}^2$). At 850, a second excitation signal ($F_{PAS}$) is generated in the conducive element 106 at a second position. The distributed controller 102B may generate the excitation signal ($F_{PAS}$). At 852, an in-phase response to the $F_{PAS}$ excitation signal is sensed in the touch panel 101. At 854, a quadrature response to the $F_{PAS}$ excitation signal is sensed in the touch panel 101 after a delay based on $F_{PAS}$. At 856, a second response is determined based on the passenger in-phase and quadrature responses ($A_{PAS}^2=I_{PAS}^2+Q_{PAS}^2$). At 858, one of the first position or the second position is identified as an initiating position for the touch event based on the first response and the second response. At 860, the touch panel 101 is controlled based on the initiating position.

In some embodiments, an error condition is generated if both driver and passenger responses are greater than a threshold (dual touch) or if neither of the driver and passenger responses are greater than the threshold (unidentified touch). The touch controller 102 may control the touch panel 101 depending on the user identification (i.e., only one of the driver or passenger responses are greater than the threshold) by disabling certain controls, displaying different data, etc. If an error condition is detected, the touch controller 102 may default to driver restrictions for control of the touch panel 101.

Figure 9:
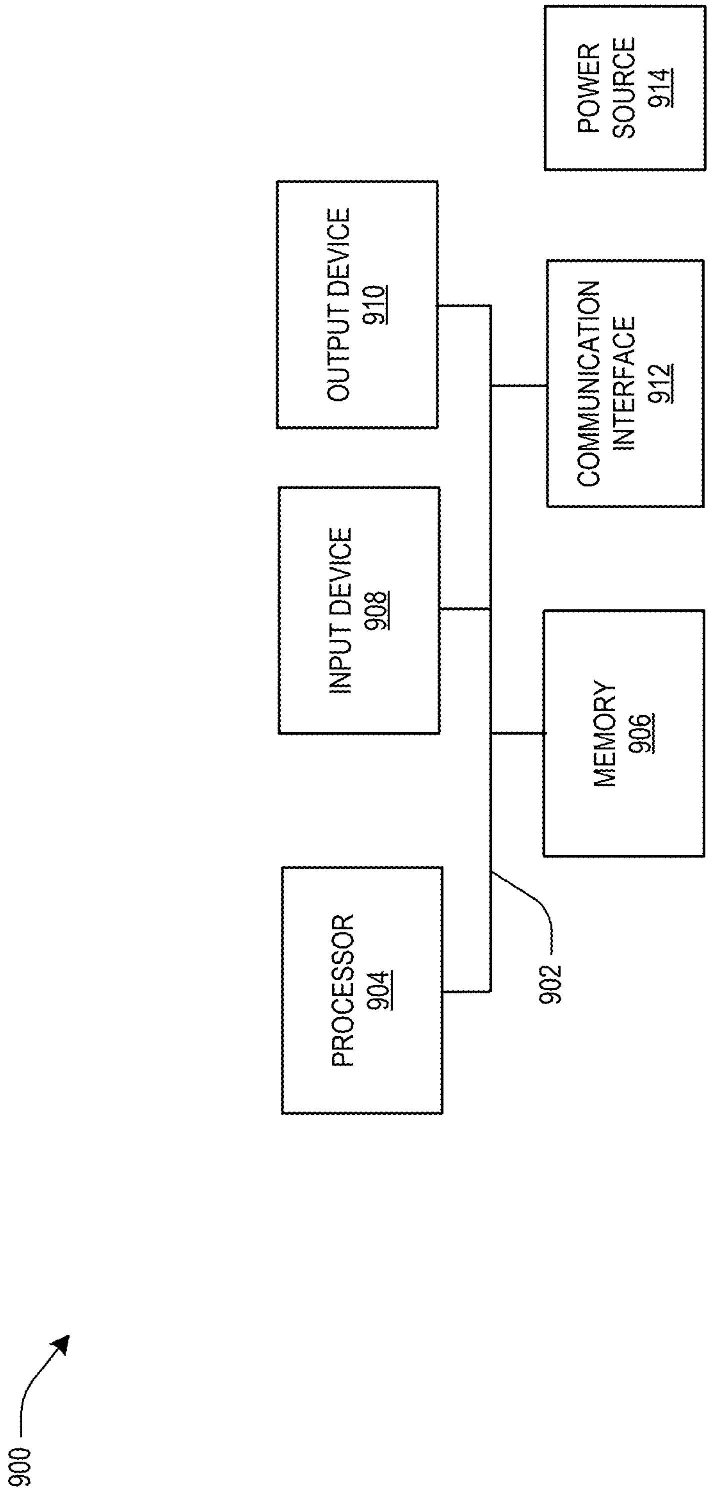
FIG. 9 is a diagram of a processing unit, in accordance with some embodiments.

FIG. 9 is a diagram of a processing unit 900, in accordance with some embodiments. The processing unit 900 may implement one or more of the SPU 214 or the post processing unit 216. In some embodiments, the processing unit 900 comprises a bus 902, a processor 904, a memory 906 that stores software instructions or operations, an input device 908, an output device 910, a communication interface 912, and a power source 914, such as a battery. The processing unit 900 may include fewer components, additional components, different components, and/or a different arrangement of components than those illustrated in FIG. 9.

According to some embodiments, the bus 902 includes a path that permits communication among the components of the processing unit 900. For example, the bus 902 may include a system bus, an address bus, a data bus, and/or a control bus. The bus 902 may also include bus drivers, bus arbiters, bus interfaces, clocks, and so forth. The processor 904 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 904 may be implemented as hardware (e.g., a microprocessor, etc.), a combination of hardware and software (e.g., a SoC, an ASIC, etc.), may include one or multiple memories (e.g., cache, etc.), etc.

The processor 904 performs one or multiple operations based on an operating system and/or various applications or computer programs (e.g., software). The processor 904 accesses instructions from the memory 906, from other components of the processing unit 900, and/or from a source external to the processing unit 900 (e.g., a network, another device, etc.). The processor 904 may perform an operation and/or a process based on various techniques including, for example, multithreading, parallel processing, pipelining, interleaving, etc.

In some embodiments, the memory 906 includes one or multiple memories and/or one or multiple other types of storage mediums. For example, the memory 906 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The memory 906 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The memory 906 may include drives for reading from and writing to the storage medium. The memory 906 may be external to and/or removable from the processing unit 900, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memory 906 may store data, software, and/or instructions related to the operation of the touch sensing system 100.

The communication interface 912 permits the processing unit 900 to communicate with other devices, networks, systems, sensors, and/or the like on a network. The communication interface 912 may include one or multiple wireless interfaces and/or wired interfaces. For example, the communication interface 912 may include one or multiple transmitters and receivers, or transceivers. The communication interface 912 may operate according to a protocol stack and a communication standard. In some embodiments, the communication interface 912 includes an antenna. The communication interface 912 may include various processing logic or circuitry (e.g., multiplexing/de-multiplexing, filtering, amplifying, converting, error correction, etc.). In some embodiments, the communication interface 912 operates using one or more of a long range wireless protocol, a short range wireless protocol, or a wired protocol.

In some embodiments, the input device 908 permits an input into the processing unit 900. For example, the input device 908 may comprise a keyboard, a mouse, a display, a touchscreen, a touchless screen, a button, a switch, an input port, speech recognition logic, and/or some other type of suitable visual, auditory, or tactile input component. The touch sensor array 202 may be incorporated into the input device 908. The output device 910 permits an output from the processing unit 900. For example, the output device 910 may include a speaker, a display, a touchscreen, a touchless screen, a projected display, a light, an output port, and/or some other type of suitable visual, auditory, or tactile output component.

Figure 10:
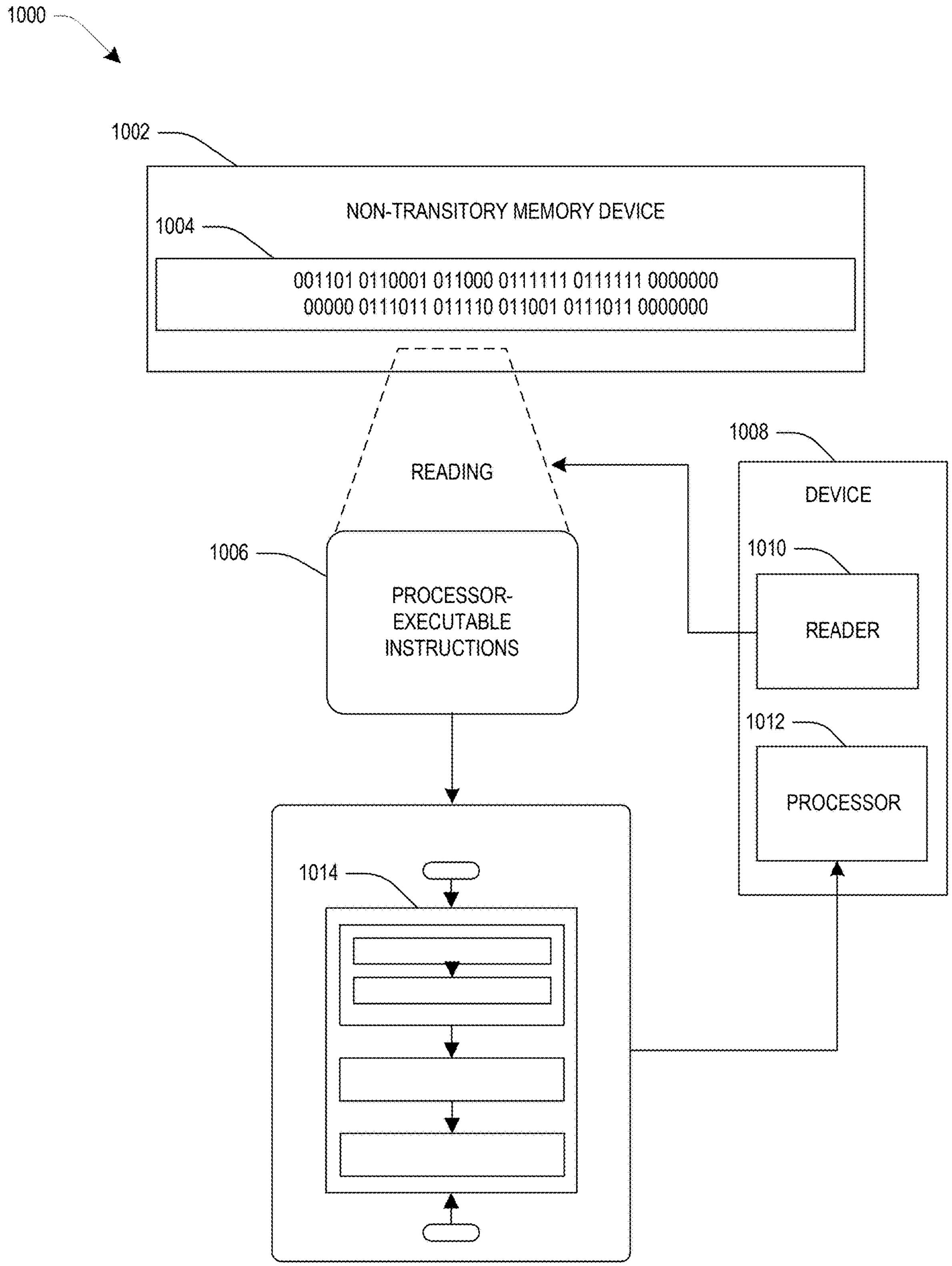
FIG. 10 illustrates an exemplary embodiment of a computer-readable medium, in accordance with some embodiments.

FIG. 10 illustrates an embodiment 1000 of a computer-readable medium 1002, in accordance with some embodiments. One or more embodiments involve a computer-readable medium comprising processor-executable instructions configured to implement one or more of the techniques presented herein. The embodiment 1000 comprises a non-transitory computer-readable medium 1002 (e.g., a CD-R, DVD-R, flash drive, a platter of a hard disk drive, etc.), on which is encoded computer-readable data 1004. This computer-readable data 1004 in turn comprises a set of processor-executable computer instructions 1006 that, when executed by a computing device 1008 including a reader 1010 for reading the processor-executable computer instructions 1006 and a processor 1012 for executing the processor-executable computer instructions 1006, are configured to facilitate operations according to one or more of the principles set forth herein. In some embodiments, the processor-executable computer instructions 1006, when executed, are configured to facilitate performance of a method 1014, such as at least some of the aforementioned method(s). In some embodiments, the processor-executable computer instructions 1006, when executed, are configured to facilitate implementation of a system, such as at least some of the one or more aforementioned system(s). Many such computer-readable media may be devised by those of ordinary skill in the art that are configured to operate in accordance with the techniques presented herein.

In an embodiment of the techniques presented herein, a method for touch detection comprises detecting a touch event on a touch panel, sending an excitation signal to the touch panel, sensing a first response to the excitation signal in a first conductive element at a first position relative to the touch panel, sensing a second response to the excitation signal in a second conductive element at a second position relative to the touch panel, identifying one of the first position or the second position as an initiating position for the touch event based on the first response and the second response, and controlling the touch panel based on the initiating position.

In an embodiment of the techniques presented herein, sensing the first response comprises sensing the first response during a first time interval and sensing the second response comprises sensing the second response during a second time interval.

In an embodiment of the techniques presented herein, sensing the first response comprises sensing the first response to the excitation signal using a sensing channel tuned to a frequency of the excitation signal during the first time interval and sensing the second response comprises sensing the second response to the excitation signal using the sensing channel during the second time interval.

In an embodiment of the techniques presented herein, detecting the touch event, sensing the first response, and sensing the second response are performed concurrently.

In an embodiment of the techniques presented herein, sending the excitation signal to the touch panel comprises sending a first excitation signal having a first frequency to the touch panel and sending a second excitation signal having a second frequency to the touch panel, sensing the first response comprises sensing the first response to the first excitation signal, and sensing the second response comprises sensing the second response to the second excitation signal.

In an embodiment of the techniques presented herein, detecting the touch event comprises sending a third excitation signal having a third frequency to the touch panel and sensing responses to the third excitation signal in the touch panel using a first sensing channel tuned to the third frequency.

In an embodiment of the techniques presented herein, sensing the first response comprises sensing the first response using a second sensing channel tuned to the first frequency and sensing the second response comprises sensing the second response using a third sensing channel tuned to the second frequency.

In an embodiment of the techniques presented herein, controlling the touch panel comprises at least one of suppressing the touch event, disabling a control on the touch panel, or determining information displayed on the touch panel.

In an embodiment of the techniques presented herein, sensing the first response to the excitation signal comprises generating a digital response signal in an analog-to digital converter proximate the first position and connected to the first conducive element, sending the digital response signal to a touch controller proximate the touch panel, and processing the digital response signal in the touch controller.

In an embodiment of the techniques presented herein, a touch sensing system, comprises a touch panel, a first distributed controller at a first position relative to the touch panel, a second distributed controller at a second position relative to the touch panel, and a touch controller configured to detect a touch event on the touch panel, establish a first communication channel with the first distributed controller, establish a second communication channel with the second distributed controller, evaluate the first communication channel and the second communication channel to identify one of the first position or the second position as an initiating position for the touch event, and control the touch panel based on the initiating position.

In an embodiment of the techniques presented herein, the touch controller is configured to send an excitation signal to the touch panel, the first distributed controller is configured to sense a first response to the excitation signal in a first conductive element at the first position to generate a first digital response signal, the second distributed controller is configured to sense a second response to the excitation signal in a second conductive element at the second position to generate a second digital response signal, and the touch controller is configured to identify the first position as the initiating position based on the first digital response signal and identify the second position as the initiating position based on the second digital response signal.

In an embodiment of the techniques presented herein, the first distributed controller is configured to sense the first response during a first time interval and the second distributed controller is configured to sense the second response during a second time interval.

In an embodiment of the techniques presented herein, the touch controller is configured to process the first digital response signal using a sensing channel tuned to a frequency of the excitation signal during the first time interval and process the second digital response signal using the sensing channel during the second time interval.

In an embodiment of the techniques presented herein, the touch controller is configured to send the excitation signal by sending a first excitation signal having a first frequency to the touch panel and sending a second excitation signal having a second frequency to the touch panel, the first response is based on the first excitation signal, and the second response is based on the second excitation signal.

In an embodiment of the techniques presented herein, the touch controller comprises a first sensing channel tuned to the first frequency to process the first digital response signal and a second sensing channel tuned to the second frequency to process the second digital response signal.

In an embodiment of the techniques presented herein, the touch controller comprises a transmit sequencer to send a third excitation signal having a third frequency to the touch panel and a third sensing channel tuned to the third frequency and configured to sense responses to the third excitation signal in the touch panel.

In an embodiment of the techniques presented herein, the touch controller is configured to control the touch panel by at least one of suppressing the touch event, disabling a control on the touch panel, or determining information displayed on the touch panel.

In an embodiment of the techniques presented herein, the first distributed controller is configured to generate a first excitation signal in a first conductive element at the first position, the second distributed controller is configured to generate a second excitation signal in a second conductive element at the second position, and the touch controller is configured to sense a first response to the first excitation signal in the touch panel, sense a second response to the second excitation signal in the touch panel, and identify one of the first position or the second position as the initiating position for the touch event based on the first response and the second response.

In an embodiment of the techniques presented herein, a touch controller comprises touch sensor array terminals, a transmit sequencer configured to generate a transmit signal selectively connectable to the touch sensor array terminals and generate an excitation signal on the touch sensor array terminals, an analog-to-digital-converter module selectively connectable to the touch sensor array terminals to measure responses to the transmit signal, and a processor configured to detect a touch event based on the responses to the transmit signal, receive a first signal responsive to the excitation signal and associated with a first position relative to the touch sensor array terminals, receive a second signal responsive to the excitation signal and associated with a second position relative to the touch sensor array terminals, identify one of the first position or the second position as an initiating position for the touch event based on the first signal and the second signal, and generate a control signal based on the initiating position.

In an embodiment of the techniques presented herein, the first signal comprises a first digital response signal and the second signal comprises a second digital response signal.

The term "computer readable media" may include communication media. Communication media typically embodies computer readable instructions or other data in a "modulated data signal" such as a carrier wafer or other transport mechanism and includes any information delivery media.

The term "modulated data signal" may include a signal that has one or more of its characteristics set or changed in such a manner as to encode information in the signal.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for touch detection, comprising:

detecting a touch event on a touch panel;

sending an excitation signal to the touch panel;

sensing a first response to the excitation signal in a first conductive element at a first position relative to the touch panel;

sensing a second response to the excitation signal in a second conductive element at a second position relative to the touch panel;

identifying one of the first position or the second position as an initiating position for the touch event based on the first response and the second response; and controlling the touch panel based on the initiating position.

2. The method of claim 1, wherein:

sensing the first response comprises sensing the first response during a first time interval; and sensing the second response comprises sensing the second response during a second time interval.

3. The method of claim 2, wherein:

sensing the first response comprises:

sensing the first response to the excitation signal using a sensing channel tuned to a frequency of the excitation signal during the first time interval; and sensing the second response comprises:

sensing the second response to the excitation signal using the sensing channel during the second time interval.

4. The method of claim 1, wherein:

detecting the touch event, sensing the first response, and sensing the second response are performed concurrently.

5. The method of claim 1, wherein:

sending the excitation signal to the touch panel comprises:

sending a first excitation signal having a first frequency to the touch panel; and sending a second excitation signal having a second frequency to the touch panel;

sensing the first response comprises:

sensing the first response to the first excitation signal; and sensing the second response comprises:

sensing the second response to the second excitation signal.

6. The method of claim 5, wherein:

detecting the touch event comprises:

sending a third excitation signal having a third frequency to the touch panel; and sensing responses to the third excitation signal in the touch panel using a first sensing channel tuned to the third frequency.

7. The method of claim 6, wherein:

sensing the first response comprises:

sensing the first response using a second sensing channel tuned to the first frequency; and sensing the second response comprises:

sensing the second response using a third sensing channel tuned to the second frequency.

8. The method of claim 1, wherein:

controlling the touch panel comprises at least one of:

suppressing the touch event;

disabling a control on the touch panel; or determining information displayed on the touch panel.

9. The method of claim 1, wherein:

sensing the first response to the excitation signal comprises:

generating a digital response signal in an analog-to digital converter proximate the first position and connected to the first conducive element;

sending the digital response signal to a touch controller proximate the touch panel; and processing the digital response signal in the touch controller.

10. A touch sensing system, comprising:

a touch panel;

a first distributed controller at a first position relative to the touch panel;

a second distributed controller at a second position relative to the touch panel; and a touch controller configured to:

detect a touch event on the touch panel;

establish a first communication channel with the first distributed controller;

establish a second communication channel with the second distributed controller;

evaluate the first communication channel and the second communication channel to identify one of the first position or the second position as an initiating position for the touch event; and control the touch panel based on the initiating position.

11. The touch sensing system of claim 10, wherein:

the touch controller is configured to send an excitation signal to the touch panel;

the first distributed controller is configured to sense a first response to the excitation signal in a first conductive element at the first position to generate a first digital response signal;

the second distributed controller is configured to sense a second response to the excitation signal in a second conductive element at the second position to generate a second digital response signal; and the touch controller is configured to:

identify the first position as the initiating position based on the first digital response signal; and identify the second position as the initiating position based on the second digital response signal.

12. The touch sensing system of claim 11, wherein:

the first distributed controller is configured to sense the first response during a first time interval; and the second distributed controller is configured to sense the second response during a second time interval.

13. The touch sensing system of claim 12, wherein:

the touch controller is configured to:

process the first digital response signal using a sensing channel tuned to a frequency of the excitation signal during the first time interval; and process the second digital response signal using the sensing channel during the second time interval.

14. The touch sensing system of claim 11, wherein:

the touch controller is configured to send the excitation signal by:

sending a first excitation signal having a first frequency to the touch panel; and sending a second excitation signal having a second frequency to the touch panel;

the first response is based on the first excitation signal; and the second response is based on the second excitation signal.

15. The touch sensing system of claim 14, wherein:

the touch controller comprises:

a first sensing channel tuned to the first frequency to process the first digital response signal; and a second sensing channel tuned to the second frequency to process the second digital response signal.

16. The touch sensing system of claim 15, wherein:

the touch controller comprises:

a transmit sequencer to send a third excitation signal having a third frequency to the touch panel; and a third sensing channel tuned to the third frequency and configured to sense responses to the third excitation signal in the touch panel.

17. The touch sensing system of claim 10, wherein:

the touch controller is configured to control the touch panel by at least one of:

suppressing the touch event;

disabling a control on the touch panel; or determining information displayed on the touch panel.

18. The touch sensing system of claim 10, wherein:

the first distributed controller is configured to generate a first excitation signal in a first conductive element at the first position;

the second distributed controller is configured to generate a second excitation signal in a second conductive element at the second position; and the touch controller is configured to:

sense a first response to the first excitation signal in the touch panel;

sense a second response to the second excitation signal in the touch panel; and identify one of the first position or the second position as the initiating position for the touch event based on the first response and the second response.

19. A touch controller, comprising:

touch sensor array terminals;

a transmit sequencer configured to:

generate a transmit signal selectively connectable to the touch sensor array terminals; and generate an excitation signal on the touch sensor array terminals;

an analog-to-digital-converter module selectively connectable to the touch sensor array terminals to measure responses to the transmit signal; and a processor configured to:

detect a touch event based on the responses to the transmit signal;

receive a first signal responsive to the excitation signal and associated with a first position relative to the touch sensor array terminals;

receive a second signal responsive to the excitation signal and associated with a second position relative to the touch sensor array terminals;

identify one of the first position or the second position as an initiating position for the touch event based on the first signal and the second signal; and generate a control signal based on the initiating position.

20. The touch controller of claim 19, wherein:

the first signal comprises a first digital response signal; and the second signal comprises a second digital response signal.

* * * * *